(12) United States Patent
Shimomura (10) Patent No.: US 6,693,744 B2
(45) Date of Patent: Feb. 17, 2004

(54) IMAGING ELEMENT AND IMAGE READING APPARATUS

(75) Inventor: Hidekazu Shimomura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 09/944,069

(22) Filed: Sep. 4, 2001

(65) Prior Publication Data

US 2002/0044357 A1 Apr. 18, 2002

(30) Foreign Application Priority Data

Sep. 5, 2000 (JP) ........................................ 2000/268680
Aug. 27, 2001 (JP) ........................................ 2001/256045

(51) Int. Cl.[7] ............................. G02B 27/44; G02B 9/00
(52) U.S. Cl. ..................... 359/565; 359/569; 359/570; 359/738
(58) Field of Search ................................ 359/565, 569, 359/570, 738, 739, 740, 771, 772, 775, 809, 742

(56) References Cited

U.S. PATENT DOCUMENTS

| | | | |
|---|---|---|---|
| 5,044,706 A | 9/1991 | Chen | 359/565 |
| 5,287,218 A * | 2/1994 | Chen | 359/365 |
| 5,786,935 A * | 7/1998 | Kanai et al. | 359/367 |
| 5,790,321 A | 8/1998 | Goto | 359/571 |
| 5,978,153 A * | 11/1999 | Nishio | 359/570 |
| 5,978,158 A * | 11/1999 | Nagata | 359/753 |
| 5,995,286 A * | 11/1999 | Mukai et al. | 359/571 |
| 6,040,943 A * | 3/2000 | Schaub | 359/565 |
| 6,064,057 A | 5/2000 | Shimomura et al. | 359/571 |
| 6,147,815 A * | 11/2000 | Fujie | 359/569 |
| 2001/0015848 A1 | 8/2001 | Nakai | 359/565 |

FOREIGN PATENT DOCUMENTS

| | | |
|---|---|---|
| EP | 1 014 150 A2 * | 6/2000 |
| JP | 4-213421 | 8/1992 |
| JP | 6-324262 | 11/1994 |
| JP | 10-133149 | 5/1998 |
| JP | 10-303127 A * | 11/1998 |
| JP | 11-125709 A * | 5/1999 |
| JP | 11-223717 | 8/1999 |

OTHER PUBLICATIONS

Londoño, et al., "The Design of Achromatized Hybrid Diffractive Lens Systems," SPIE vol. 1354, International Lens Design Conference, pp. 30–37 (1990).

Farn, et al., "Diffractive Doublet Corrected On–Axis at Two Wavelengths," SPIE vol. 1354, International Lens Design Conference, pp. 24–26 and 29 (1990).

A.P. Wood, "Using Hybrid Refractive–Diffractive Elements in Infrared Petzval Objectives," SPIE vol. 1354, International Lens Conference, pp. 316–322 (1990).

Kathman, et al., "Binary Optics in Lens Design," SPIE vol. 1354, International Lens Design Conference, pp. 297–309 (1990).

U.S. patent application Ser. No. 09/717,239, filed Nov. 22, 2000.

* cited by examiner

*Primary Examiner*—John Juba
(74) *Attorney, Agent, or Firm*—Fitzpatrick, Cella, Harper & Scinto

(57) ABSTRACT

An imaging element includes a diffraction optical element on which an off-axis beam with a field angle is incident and a stop. Of beams having different field angles and incident on the diffraction optical element, beams having incident angles larger than the incident angle of a principal light ray of the beams incident on the grating surface of the diffraction optical element are partially shielded by a light-shielding member, so that the diffraction efficiencies of orders adjacent to a design order are kept low and hence imaging performance almost free from flare can be achieved even if a beam with a field angle is incident.

19 Claims, 10 Drawing Sheets

$$\frac{0.4Df}{Y\beta} < L < \frac{1.2Df}{Y\beta}$$

FIG. 5

$\theta_2 < \theta < \theta_1$

$\theta_2 < \theta < \theta_1$

IMAGING ELEMENT AND IMAGE READING APPARATUS

BACKGROUND OF THE INVENTION

1. Field of the Invention

The present invention relates to an imaging element for making an off-axis beam with a field angle become incident on a diffraction optical element and, more particularly, to an imaging element suitable for a variety of optical systems such as a photographic camera, video camera, binocular, projector, telescope, microscope, and copying machine, in which beams in the wavelength range used concentrate on a specific order (design order) and a high diffraction efficiency can be obtained in the wavelength range used.

The present invention also relates to an image reading apparatus which has a controller for generating various control signals in an apparatus used for a copying machine, image scanner, facsimile apparatus, multifunctional printer and the like each of which has an imaging element having a diffraction optical element.

2. Related Background Art

An optical system has a variety of aberrations, and optical elements are so assembled as to correct these aberrations. Of all the aberrations generated in an optical system, chromatic aberration is conventionally reduced by combining glass materials having different dispersion characteristics. In the objective lens of a telescope or the like, a low-dispersion glass material and a high-dispersion glass material are used to form positive and negative lenses, respectively, and these lenses are combined to eliminate on-axis chromatic aberration. When the number of constituent lenses is limited, or usable glass materials are limited, chromatic aberration cannot be satisfactorily eliminated.

As opposed to the conventional method of reducing chromatic aberration by a combination of glass materials, methods of reducing chromatic aberration by arranging a diffraction optical element (to be referred to as a diffraction grating hereinafter) having diffraction action on a lens surface or in part of an optical system are disclosed in SPIE Vol. 1354 International Lens Design Conference (1990), Japanese Laid-Open Patent Application Nos. 4-213421 and 6-324262, and U.S. Pat. No. 5,044,706. Such a method uses a physical phenomenon wherein the refraction and diffraction surfaces of an optical system exhibit chromatic aberration outputs in opposite directions with respect to a light ray having a given reference wavelength.

This will be briefly described with reference to FIG. 9. A diffraction optical element 11 is placed in air with a refractive index of 1 and is perpendicular to an optical axis 13. Diffracted light emerges in a diffraction direction θ of a light ray A parallel to the optical axis 13:

$$P \sin \theta = m\lambda \quad (1)$$

where P is the periodic pitch of the diffraction grating 12, m is the order of diffracted light, and λ is the wavelength.

Figure 9:
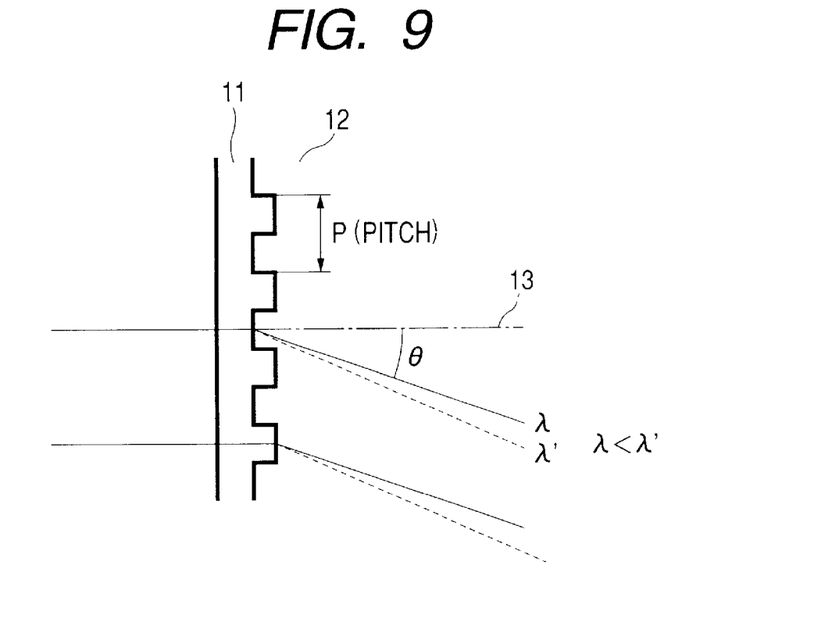
FIG. 9 is a view for explaining diffraction action.

FIG. 9 shows the periodic structure in only one direction. When such a periodic structure is built rotationally symmetrically about the optical axis or the like, and the periodic pitch of the diffraction grating is gradually changed, the resultant annular structure having this periodic structure serves as a lens. A lens using such diffraction action has a larger diffraction angle at a longer wavelength with a given order according to equation (1). With this lens, the positional relationship between the imaging points depending on wavelengths is opposite to that of a refractive lens having power in the same direction. The above references mainly use this principle to correct aberration (chromatic aberration).

In refraction, one light ray is one light ray upon refraction. In diffraction, however, one light ray is diffracted into light components of the respective orders. When a diffraction optical element is used as a lens system, the diffraction grating structure is determined so that the beams in the wavelength range used concentrate on a specific order (to be referred to as a design order hereinafter). When the intensities of light beams concentrate on the specific order, the direction of remaining diffracted light is represented by equation (1), but its intensity is low. When the intensity is zero, no diffracted light is present.

To increase the diffraction efficiency of mth-order diffracted light, if a phase difference of $2\pi m$ is imparted to the optical-path light rays in the diffraction direction, the light rays are brought to interference and strengthened.

To impart a phase difference of $2\pi m$ to mth-order diffracted light in a transmission diffraction grating, the following condition must be satisfied:

$$2\pi m = 2\pi d(n-1)/\lambda \quad (2)$$

where d is the height of the grating and n is the refractive index of the material of the grating. When condition (2) holds between the respective pitches, the diffraction efficiency is maximized.

The detailed structure of a diffraction optical element for obtaining this diffraction action is called a kinoform. Known examples of the kinoform are a kinoform with a continuous portion for imparting a phase difference of $2\pi$, a kinoform having a binary shape approximating a continuous phase difference profile stepwise, and a kinoform obtained by approximating a fine periodic structure into a triangular shape. Such a structure is formed on the surface of a flat plate or the surface of a lens to exhibit the diffraction effect. Such a diffraction optical element is manufactured by cutting or a semiconductor process such as lithography.

Such a diffraction optical element is excellent in effect for particularly correcting chromatic aberration occurring on a refraction surface upon glass material dispersion. The period of the periodic structure is changed to exhibit the effect of an aspherical lens. The periodic structure can greatly reduce the aberration.

The known examples reduce various aberrations and particularly chromatic aberration due to the diffraction effect. The effect of incorporating a diffraction optical element in an optical system can be confirmed on an aberration chart. When the diffraction efficiency of diffracted light contributing to a reduction in aberrations is not high, this diffracted light is not present in practice. The diffraction efficiency of a light ray for reducing aberration must therefore be sufficiently high. When light rays with an order different from the design order are present, these light rays form an image at a position different from that formed by the light ray of the design order to cause flare or ghost, thereby reducing the image contrast. The diffraction efficiency profile and the behavior of light rays with orders different from the design order must also be carefully considered.

Figure 10:
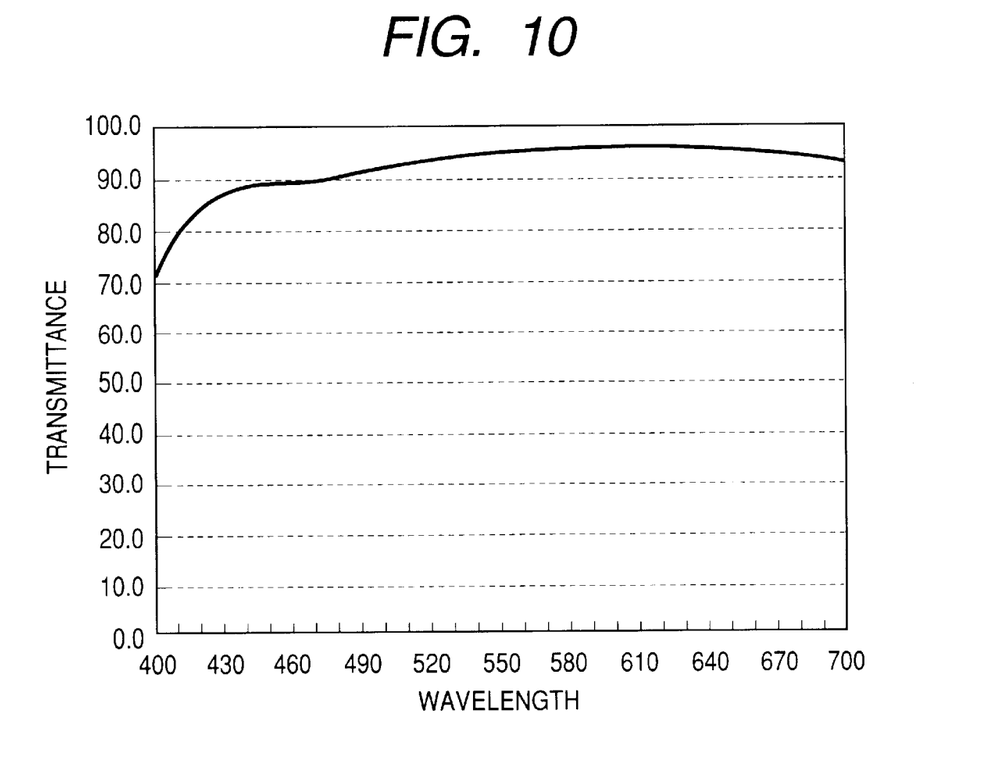
FIG. 10 is a graph for explaining the spectral characteristic of a typical lens.

FIG. 10 shows the spectral transmission characteristic of a general optical system. In FIG. 10, the wavelength is plotted along the abscissa and the spectral transmittance is plotted along the ordinate. This spectral transmission characteristic is determined by light absorption and reflection at a refraction surface of glass. A spectral transmission characteristic matching an evaluation target in the wavelength used is required for this optical system.

Figure 11:
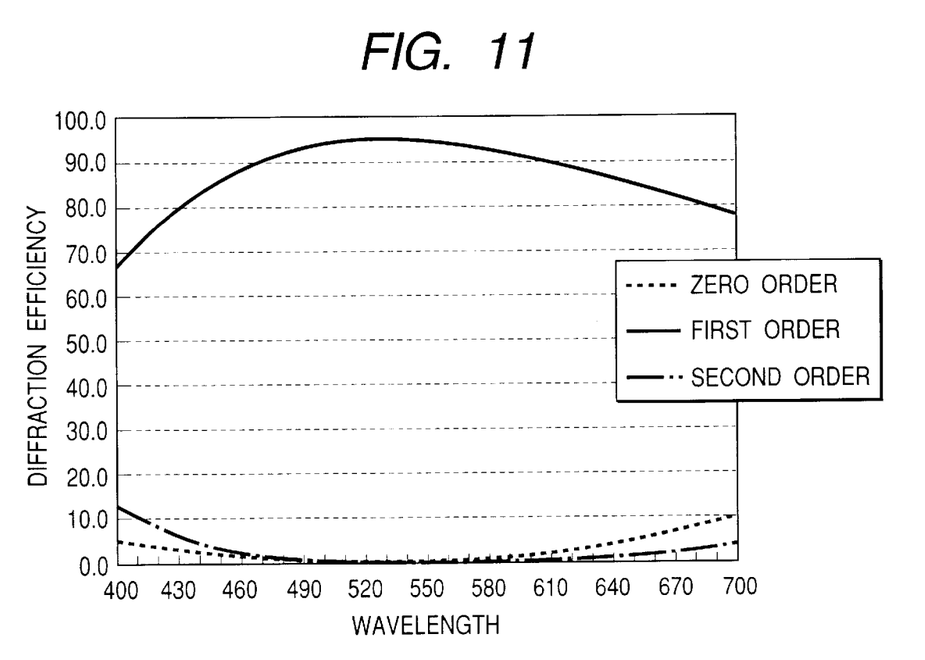
FIG. 11 is a graph for explaining the diffraction efficiency of a conventional diffraction grating.

FIG. 11 shows a diffraction efficiency characteristic with respect to a specific diffraction order when a diffraction optical element is formed on a given surface. In FIG. 11, the wavelength is plotted along the abscissa and the diffraction efficiency is plotted along the ordinate. This diffraction optical element is designed so that the diffraction efficiency maximizes in the first order (indicated by a solid line in FIG. 11) in the wavelength range used. That is, the design order is the first order. The diffraction efficiencies of the diffraction orders (first order±first order) adjacent to the design order are also shown in FIG. 11. As shown in FIG. 11, the diffraction efficiency in the design order maximizes at a given wavelength (to be referred to as a design wavelength hereinafter) and gradually decreases at remaining wavelengths due to the following reason. Although the thickness of the grating which makes the phase difference $2\pi$ is exhibited in equation (2), when the thickness of the grating is so set as to satisfy this condition at the design wavelength, the condition does not hold slightly at other wavelengths to result in a decrease in diffraction efficiency.

Figure 12:
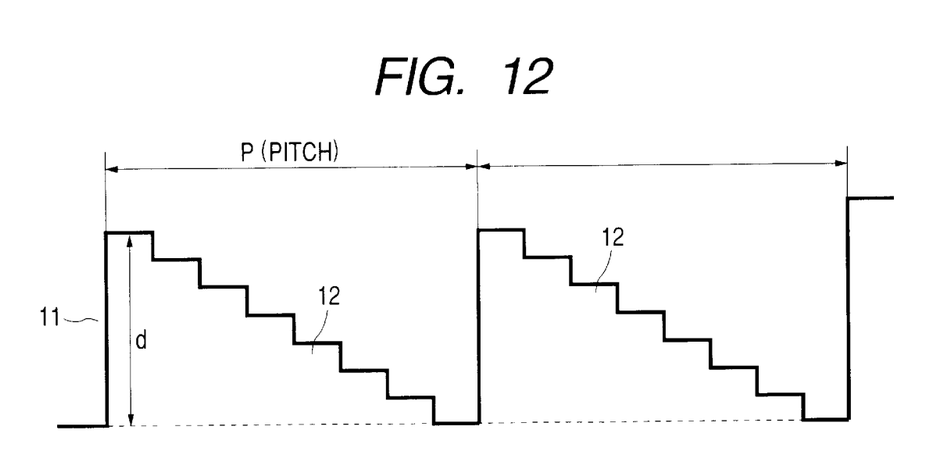
FIG. 12 is a view for explaining the conventional diffraction grating.

For example, as shown in FIG. 12, assume that the microstructure of the diffraction grating 12 forming the diffraction optical element 11 is formed by a stepwise binary structure. In this case, when the design wavelength for the first-order light of the diffraction optical element 11 is 530 nm, an actual grating structure is formed such that each step has a thickness of 143.7 nm obtained by dividing by eight a thickness d=1150 nm obtained when m=1, $\lambda$=530 nm, and n=1.461 for $2\pi m = 2\pi d (n-1)/\lambda$. In this case, the diffraction efficiency at the design wavelength is about 95%, the diffraction efficiency for the first-order light at the wavelength of 400 nm is about 67%, and the diffraction efficiency for the first-order light at the wavelength of 650 nm is 85%. Care must be taken in an optical system using the diffraction effect such that the design wavelength of this system must be set near the center of the wavelength range used. When only the diffraction efficiency in the design order is taken into consideration, it must be considered in the same manner as in the spectral transmission characteristic.

Figure 13:
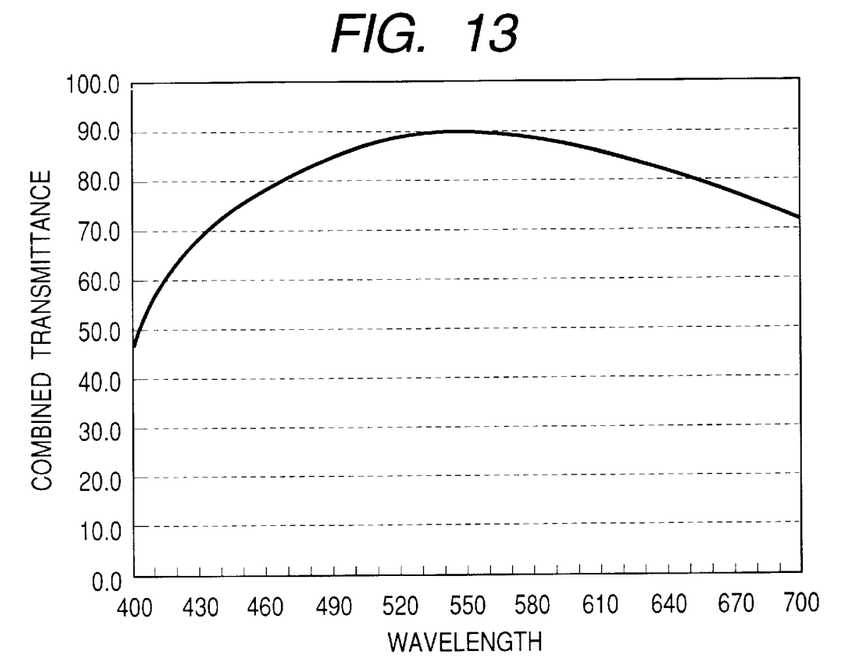
FIG. 13 is a graph for explaining the product of the spectral characteristic and diffraction efficiency.

The spectral transmission characteristic of the entire optical system in the design order is defined as:

$$\eta(\lambda) = \eta LENS(\lambda) \times \eta DOE(\lambda)$$

where $\eta LENS$ is the spectral transmission characteristic except the diffraction surface of the optical system including the diffraction optical element as a function of the wavelength, and $\eta DOE$ is the diffraction efficiency of the diffraction optical element. When a diffraction surface having the diffraction efficiency shown in FIG. 11 is added to an optical system having the spectral characteristic shown in FIG. 10, the spectral transmission characteristic in the design order is as shown in FIG. 13. In the wavelength range used, the diffraction efficiency in the design order is preferably high.

The influence of diffracted light of orders other than the design order will be described below. The light of orders other than the design order appears on an evaluation surface in a defocused state. This will briefly be explained. Assume that the design order is the first order, and that the power of a lens having a diffraction effect is positive. In this case, diffracted light beams of orders (second, third, . . . ) higher than the design order have larger diffraction angles according to equation (1) and form images at a position before the primary imaging position. The diffraction position value increases with an increase in order from the design order. Similarly, the diffracted light beams of orders (zero order, minus first order, . . . ) lower than the design order form images at positions behind the primary imaging position. Since the evaluation surface is located at the diffracted light imaging position of the design order, the diffracted light beams of orders other than the design order appear on the imaging surface in defocused states.

Since all the diffracted light beams of orders much larger or smaller than the design order are greatly blurred on the evaluation surface, they do not contribute to imaging and are added on the entire surface in the state of flare.

On the other hand, the diffracted light beams of orders (first order±first order) adjacent to the design order do not resolve in the spatial frequency range for evaluating the imaging performance. These light beams form images which are not perfectly blurred but resolve in a low spatial frequency range. For this reason, when the diffraction efficiency of such a diffraction order is high, a spot with a considerably large side lobe around the diffracted light of the design order is formed, thus degrading the optical performance. The diffraction efficiencies of the diffraction orders (zero order and second order) near the design order are almost zero, as shown in FIG. 11. The diffraction orders away from the design wavelength have several % diffraction efficiencies. A light amount integrated in the wavelength range used is about 2%, and a light amount of as small as about 0.5% is obtained depending on the type of photosensitive object placed on the evaluation surface. An image corresponding to this light amount is blurred on the evaluation surface, and the light amount per unit area is very small. Generally, the light cannot be detected as a side lobe.

However, when an optical system using this diffraction effect is used for a lens (phototaking system) or the like in a camera, a special condition must be considered. In a camera, a film or CCD is used as the evaluation surface, and phototaking conditions (object and exposure) vary. If a high-luminance light source is present in part of an object, the high-luminance light source is saturated exceeding the optimal exposure of the film or CCD, and the remaining object portion is adjusted to the optimal exposure. Under these conditions, phototaking is done. In this case, since the light source has an exposure value several times the optical exposure, the diffracted light beams of diffraction orders adjacent to the design order are also multiplied several times. A side lobe may be observed as backlight around the light source.

When the diffraction optical element is used for an optical system having a variety of exposure conditions like a camera, the efficiencies of the diffraction orders adjacent to the design order must preferably be reduced.

Figure 14:
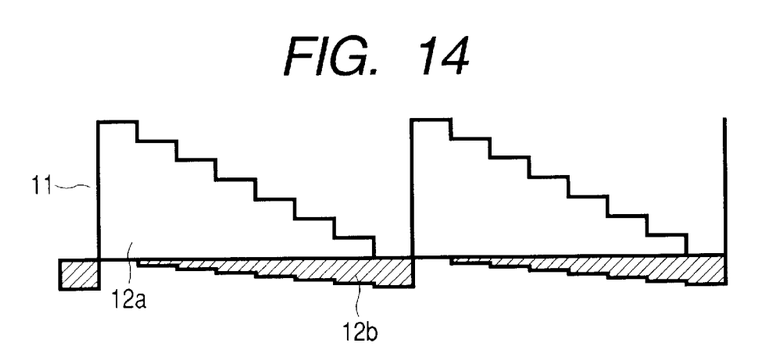
FIG. 14 is a view for explaining a conventional diffraction optical element.
Figure 15:
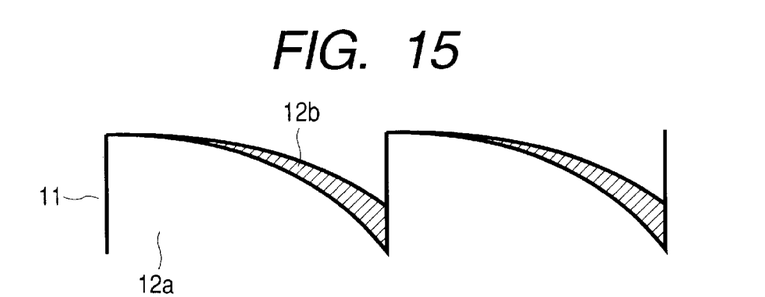
FIG. 15 is a view for explaining another conventional diffraction optical element.
Figure 16:
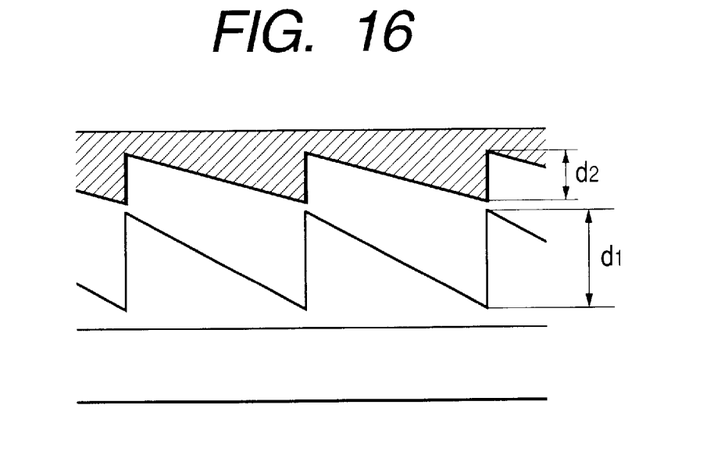
FIG. 16 is a view for explaining still another conventional diffraction optical element.

As shown in FIGS. 14, 15, and 16, a diffraction optical element is formed from at least two diffraction gratings stacked on each other and made of materials having different Abbe's numbers (dispersions). With this arrangement, the diffraction efficiency can be enhanced over the entire wavelength region used while the diffraction efficiencies of orders adjacent to the design order can be reduced. When the diffraction optical element is used for an optical system, various aberrations such as chromatic aberration or the like can be properly corrected. The diffraction optical element is suitable for a variety of optical systems such as a phototaking camera, video camera, binocular, projector, telescope, microscope, and copying machine. Various diffraction optical elements and optical systems using them are disclosed in Japanese Laid-Open Patent Application Nos. 10-133149 and 11-223717.

The conventional diffraction optical element is designed such that the diffraction efficiency of the design order (first order) is high in the wavelength range used, and diffraction efficiencies of orders adjacent to the design order are reduced when a light beam (light ray) is perpendicularly incident on the conventional diffraction optical element. However, no consideration is made for a beam with a field angle, i.e., the field angle characteristics of diffraction efficiency.

Figure 17:
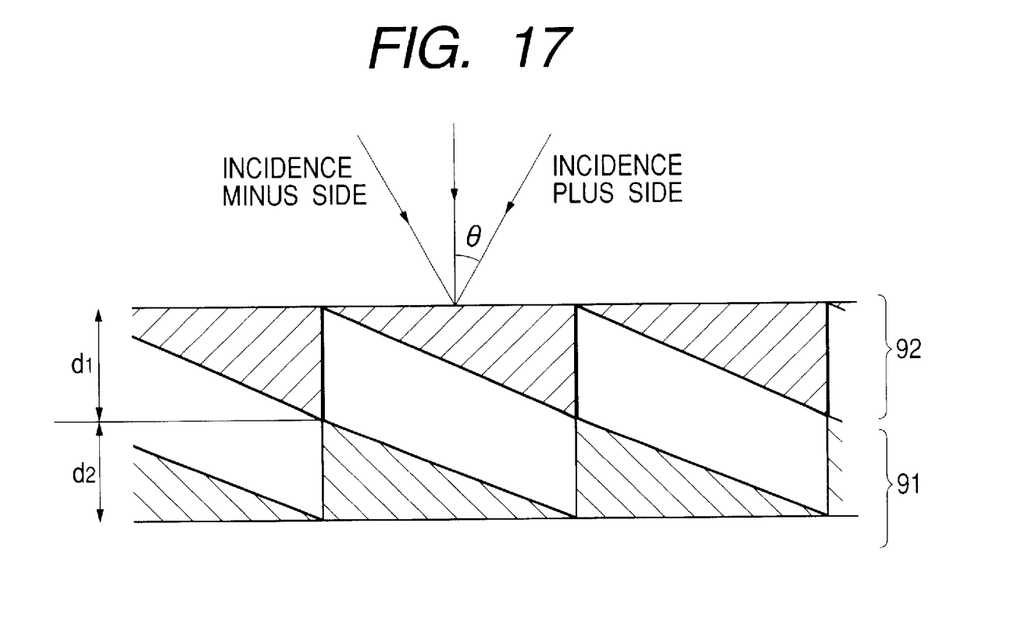
FIG. 17 is a view for explaining a conventional multilayered diffraction grating.
Figure 18:
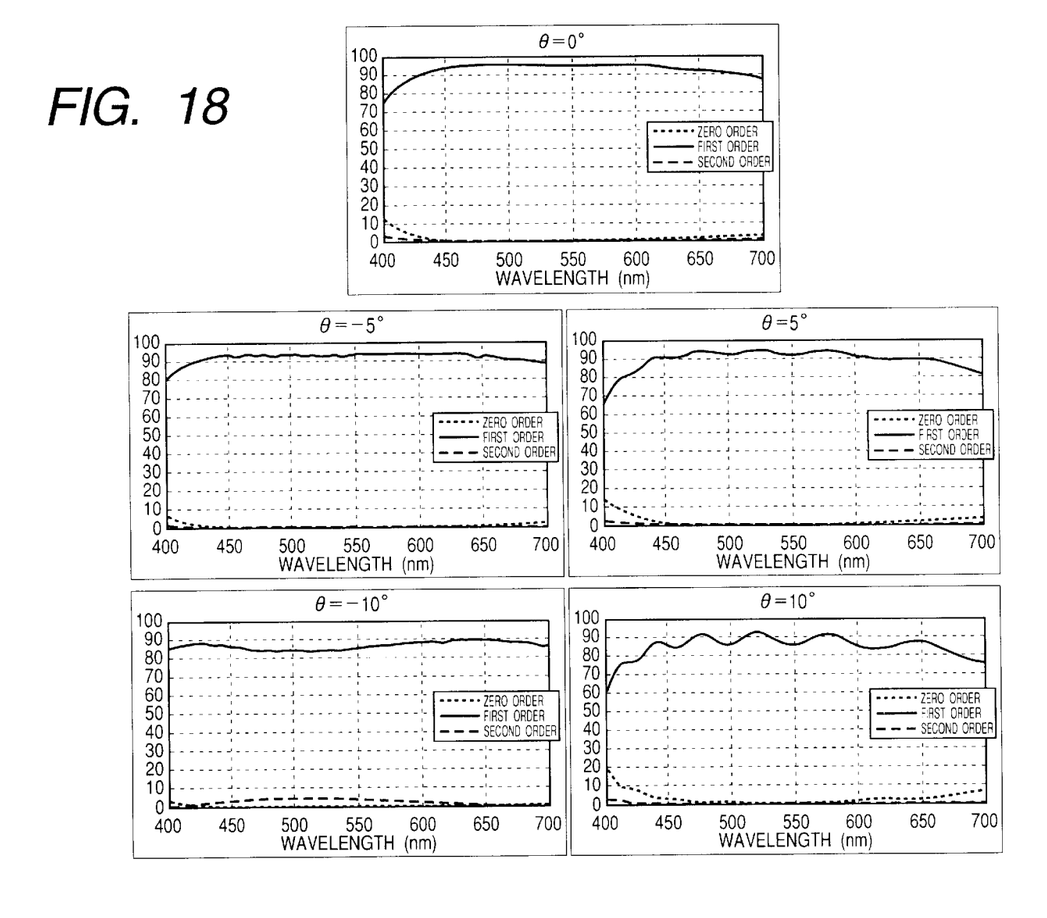
FIG. 18 is a view for explaining the diffraction efficiency of a conventional diffraction grating.

For example, as shown in FIG. 17, assume that the pitch of a diffraction grating is 100 μm, that the material of a diffraction grating 91 is UV1000 (nd=1.6363, vd=23.0) available from Mitsubishi Chemical Corp., that the material of a diffraction grating 92 is RC8922 (nd=1.5129, vd=51.0), and that the grating depths of the gratings 91 and 92 are set to d1=7.432 μm and d2=10.295 μm, respectively. In this case, when the incident angles are set to θ=0°, ±5°, and ±10°, the diffraction efficiencies are shown in FIG. 18. As can be apparent from FIG. 18, when the field angle increases, the diffraction efficiencies of orders adjacent to the design order increase in the visible range. Particularly, the incident angle on the minus (−) side poses a problem because the diffraction efficiency of secondary light increases at a wavelength near 500 nm to which the human eye is sensitive.

In an optical system in which light beams at various angles are present, preferably, the diffraction efficiency of the design order (first-order diffracted light) is high in the wavelength range used and the diffraction gratings of orders adjacent to the design order are reduced even if the beams are incident on the grating surface at various angles.

SUMMARY OF THE INVENTION

It is an object of the present invention to provide an imaging lens using the above diffraction optical element, wherein of beams having field angles and incident on the diffraction optical element, beams having incident angles larger than the incident angle of a principal light ray of the beams incident on the grating surface are partially shielded by a light-shielding member, so that the diffraction efficiencies of orders adjacent to a design order are kept low and hence imaging performance almost free from flare can be achieved even if a beam with a field angle is incident.

In one aspect of the invention, there is provided an imaging element including a diffraction optical element on which an off-axis beam with a field angle is incident and a stop, said imaging element comprising a limiting member located at a position farther away from said diffraction optical element than said stop, wherein of off-axis beams having field angles and incident on said diffraction optical element, a beam having an incident angle larger than an incident angle of a principal ray of the beams incident on a grating surface of said diffraction optical element is partially shielded by said limiting member, wherein the incident angle is an angle defined by the beam and the normal to the grating surface.

In a further aspect of the imaging element, said diffraction optical element is disposed to face said stop.

In a further aspect of the imaging element, said limiting member is located outside a lens constituting said imaging element along an optical axis with respect to said diffraction optical element as the center.

In a further aspect of the imaging element, a grating pitch of said diffraction optical element is reduced from an on-axis side to an off-axis side.

In a further aspect of the imaging element, said imaging element comprises a diffraction optical element in which first and second diffraction gratings with different Abbe's numbers and different refractive indices are arranged on a substrate such that grating surfaces thereof face each other.

In a further aspect of the imaging element, said limiting member is disposed on an incident and/or exit side of said imaging element.

In a further aspect of the imaging element, one of said first and second diffraction gratings, which is made of a material having a higher refractive index is disposed on the original surface side.

In a further aspect of the imaging element, said one diffraction grating made of the material having a higher refractive index has an incident surface as a flat surface.

In a further aspect of the imaging element, each of said first and second diffraction gratings is formed on a flat substrate.

In a further aspect of the imaging element, said first and second diffraction gratings are so stacked as to correspond to each other for each pitch.

In a further aspect of the imaging element, said limiting member comprises a second stop.

In a further aspect of the imaging element, said limiting member comprises a reflecting mirror.

In a further aspect of the imaging element, said limiting member is provided on a surface of a lens constituting said imaging element.

In a further aspect of the imaging element, said imaging element comprises a lens for forming on a reading element surface an image of image information formed on an original illuminated with a beam from a light source.

In a further aspect of the imaging element, said imaging element comprises a positive first lens, a negative second lens, a negative third lens, and a positive fourth lens in the order named from the original surface side, said stop is disposed between said negative second lens and said negative third lens, and said diffraction optical element is disposed near said stop.

In a further aspect of the imaging element, letting D be a diameter of said stop, f be a focal length of said imaging element, Y be a maximum object height, and β be an absolute value of an imaging magnification, a distance L from said stop to said second stop serving as the exit-side light-shielding member along the optical axis falls within a range:

$$(0.4 \times D \times f)/(Y \times \beta) < L < (1.2 \times D \times f)/(Y \times \beta).$$

In a further aspect of the imaging element, letting D be a diameter of said stop, f be a focal length of said imaging element, Y be a maximum object height, and β be an absolute value of an imaging magnification, a distance L from said stop to said second stop serving as the incident-side light-sheilding member along the optical axis falls within a range:

$$(0.4 \times D \times f)/(Y \times \beta) < L < (1.2 \times D \times f)/(Y \times \beta).$$

In another aspect of the invention, there is provided an image reading apparatus which forms on the reading element surface the image information formed on the original using said imaging element of any one of the foregoing aspects and includes a controller.

DETAILED DESCRIPTION OF THE PREFERRED EMBODIMENTS

Reference Example 1

Figure 1:
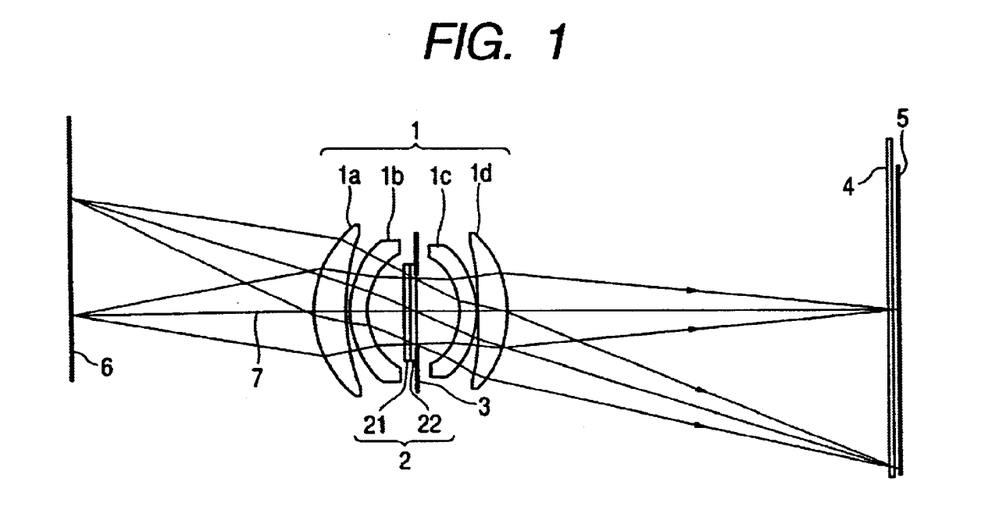
FIG. 1 is a side view showing the main part of Reference Example 1 when a diffraction optical element of the present invention is used in an image reading apparatus.

FIG. 1 is a sectional view (main-scanning sectional view) showing the main part of Reference Example 1 along the main-scanning direction when a diffraction optical element of the present invention is used for an imaging element in an image reading apparatus.

Referring to FIG. 1, image information is formed on an original surface 6. An imaging element 1 has a positive first lens 1a, negative second lens 1b, negative third lens 1c, and positive fourth lens 1d in the order named from the original surface 6 side. A stop 3 is inserted between the negative second lens 1b and negative third lens 1c. A diffraction optical element 2 (to be described later) is disposed near the stop 3. Note that the structure of the imaging element 1 is not limited to the above structure.

The diffraction optical element 2 is comprised of a multilayered diffraction grating in which saw-toothed (triangular wave-shaped) first and second diffraction gratings 21 and 22 made of materials with different Abbe's numbers and different refractive indices are stacked and arranged (bonded) on a substrate so as to correspond to each other for each pitch. Of the first and second diffraction gratings 21 and 22, the first diffraction grating 21 whose material has a higher refractive index is arranged on the light incident side (original surface side). Each of the first and second diffraction gratings 21 and 22 is formed on a flat substrate, and the grating pitch is reduced away from an optical axis 7. The light incident surface of the first diffraction grating 21 is formed from a flat surface.

In Reference Example 1, a refractive index $n1$ and Abbe's number $v1$ of the material of the first diffraction grating 21 are:

$$n1=1.6363 \quad v1=23.0$$

and a refractive index $n2$ and Abbe's number $v2$ of the material of the second diffraction grating 22 are:

$$n2=1.5219 \quad v2=51.0$$

Since the diffraction optical element 2 is disposed near the stop 3 in Reference Example 1, as described above, a chromatic aberration correction effect mainly for the imaging element 1 is imparted.

A reading element 5 is comprised of, e.g., a line sensor (CCD). A cover glass member 4 for a line sensor is disposed near the line sensor 5.

In Reference Example 1, an original placed on an original table (not shown) is illuminated with a beam from an illumination means (not shown). A beam based on the image information from the original is condensed by the imaging element 1 to form an image on the line sensor 5 surface. The original surface 6 and the line sensor 5 are moved relatively to each other in a direction (sub-scanning direction) perpendicular to the plane of paper, thereby accurately reading the image information of the original.

Figure 2:
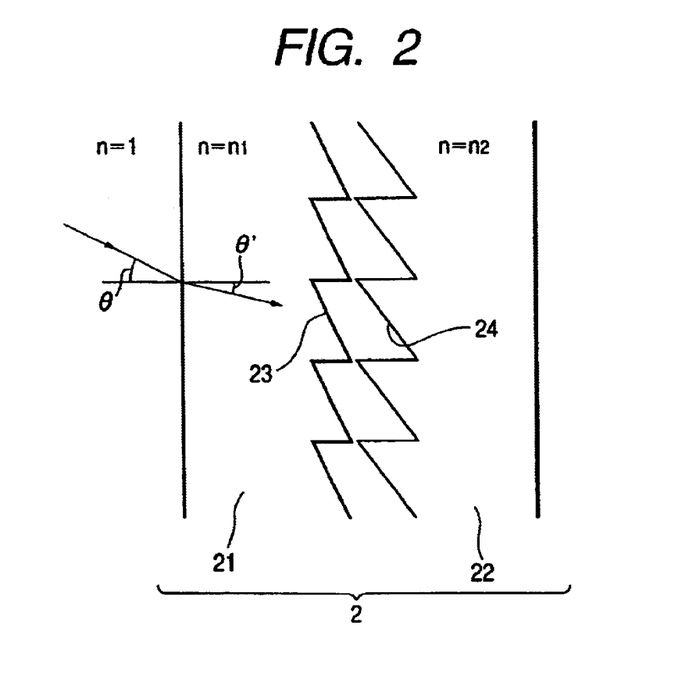
FIG. 2 is an enlarged view of a diffraction grating shown in FIG. 1.

FIG. 2 is an enlarged view showing part of the multilayered diffraction optical element 2 according to Reference Example 1. FIG. 2 shows a state in which a beam (light ray) is incident on the first diffraction grating 21 at an incident angle θ. The same reference numerals as in FIG. 1 denote the same parts in FIG. 2.

As described above, the diffraction efficiency of a diffraction grating greatly changes depending on the incident angle θ. In an image reading apparatus, for example, a maximum field angle is generally about 20°. A beam incident at an incident angle θ almost equal to the maximum field angle is present although the incident angle depends on the lens type or the position of a diffraction grating. This incident angle θ cannot be changed, but an exit angle θ' of a beam toward a grating surface 23 can be reduced.

Assume that a diffraction grating with the refractive index $n1=1.5163$ is used. In this case, the incident and exit angles are:

$$\theta=20° \quad \theta'=13.04°$$

When a diffraction grating with a higher refractive index $n1=1.834$ is used, the incident and exit angles are:

$$\theta=20° \quad \theta'=10.75°$$

This indicates that the exit angle can be reduced by about 2.3° as compared with the use of the diffraction grating with the refractive index $n1=1.5163$.

That is, if the first and second diffraction gratings 21 and 22 made of materials having different Abbe's numbers are arranged (bonded) such that their grating surfaces face each other, the wavelength characteristic of diffraction efficiency can be improved. Of the first and second diffraction gratings 21 and 22, the first diffraction grating 21 whose material has a higher refractive index is disposed on the original surface 6 side (light incident side), thereby reducing the exit angle θ' of the beam toward the grating surface 23. This makes it possible to improve the field angle characteristic (angle characteristic) of diffraction efficiency.

Figure 3:
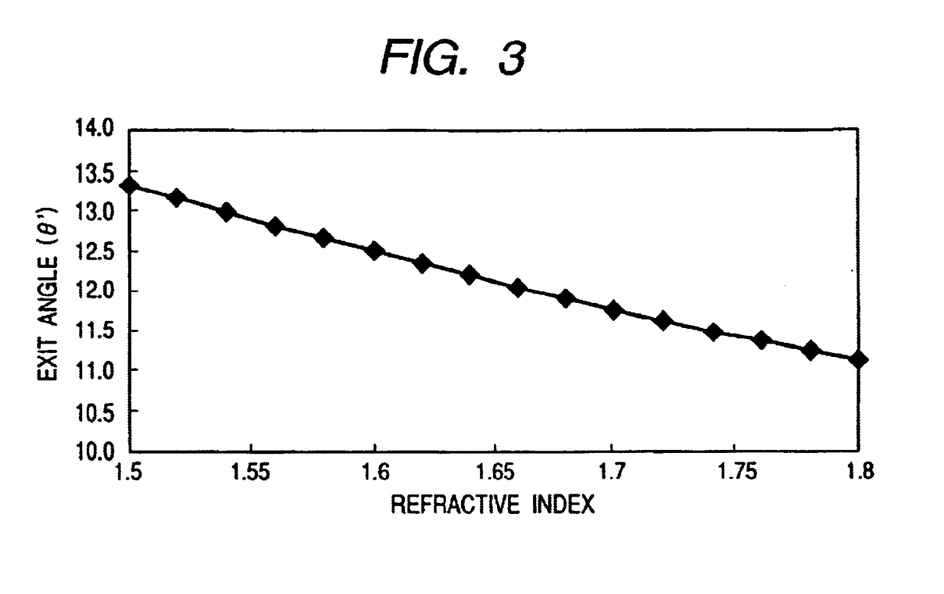
FIG. 3 is a graph for explaining the relationship between the refractive index and exit angle of Reference Example 1 of the present invention.

FIG. 3 is a graph for explaining the relationship between the exit angle θ' and refractive index n when beams are incident on diffraction gratings of the refractive indices n=1.5 to 1.8 at a maximum field angle θ=20° in the image reading apparatus.

When a diffraction grating with a high refractive index is disposed on the original surface side, the exit angle θ' of the beam toward the grating surface can be reduced, as shown in FIG. 3, thereby improving the field angle characteristic of diffraction efficiency.

(First Embodiment)

Figure 4:
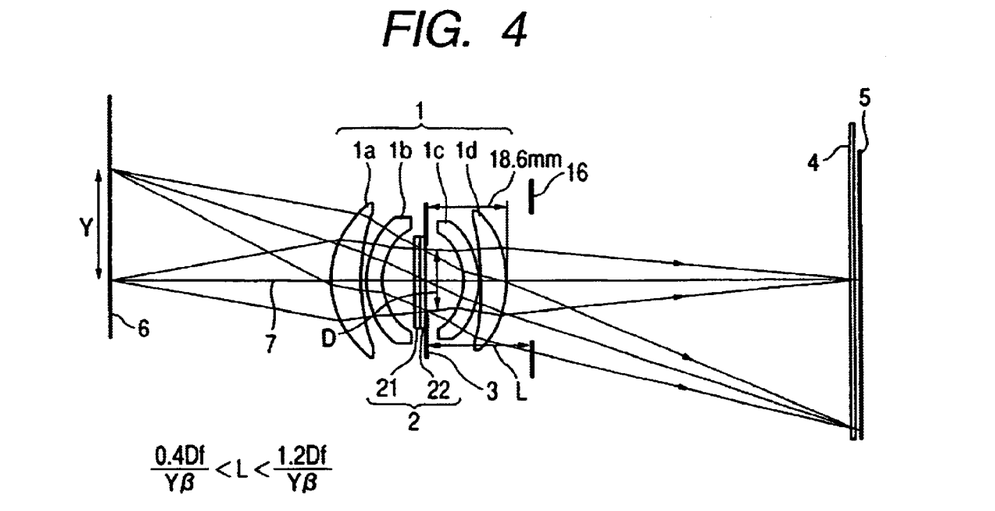
FIG. 4 is a side view showing the main part of the first embodiment when the diffraction optical element of the present invention is used in an image reading apparatus.
Figure 5:
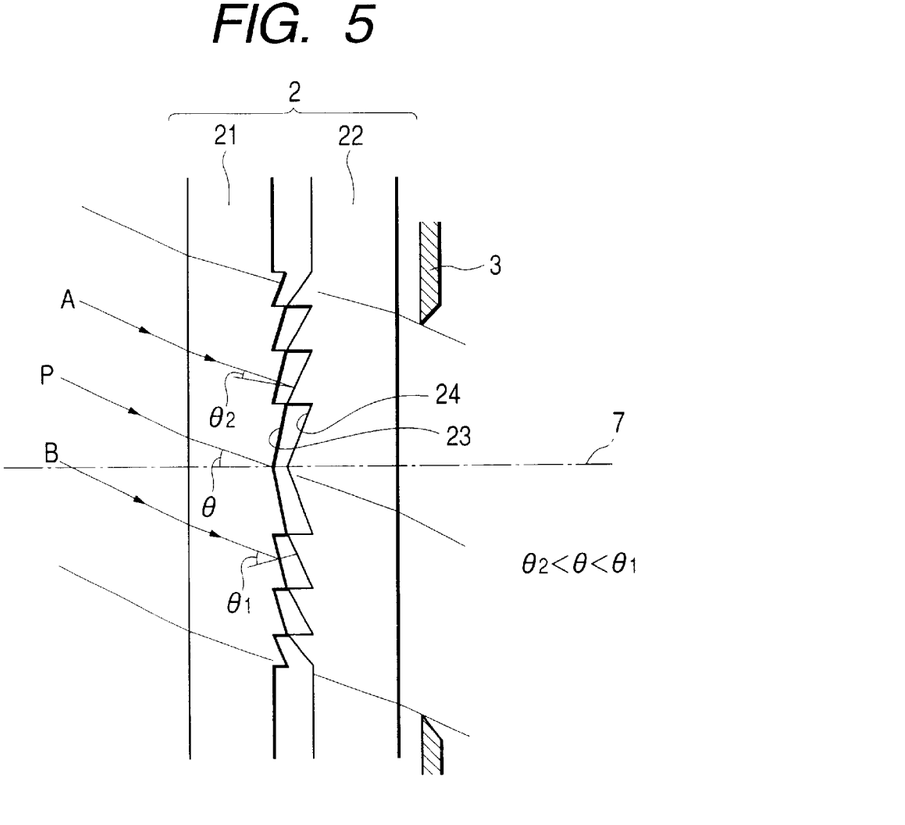
FIG. 5 is an enlarged view of a diffraction grating shown in FIG. 4.

FIG. 4 is a sectional view (main-scanning sectional view) showing the main part of the first embodiment in the main-scanning direction when the diffraction optical element of the present invention is used for an imaging element in an image reading apparatus. FIG. 5 is an enlarged view showing part of a diffraction optical element shown in FIG. 4. FIG. 5 shows a state in which an off-axis beam is shielded by a light-shielding member (stop) 16. The same reference numerals as in FIGS. 1 and 2 denote the same parts in FIGS. 4 and 5.

This embodiment is different from Reference Example 1 in that a stop 16 serving as a light-shielding member is disposed on the exit side of an imaging element 1. The remaining arrangement and optical action are the same as those of Reference Example 1, thereby obtaining the same effects.

More specifically, the stop 16 serving as the light-shielding member is disposed on the exit side (CCD side) of the imaging element 1. Of beams having field angles and incident on a diffraction optical element 2, beams on the side (B side) where incident angles $θ_1$ are larger than the incident angle θ of a principal ray P of the beams incident on the grating surface 23 of the first diffraction grating 21 are partially shielded.

The diffraction optical element 2 of this embodiment has a concentric shape with the optical axis. The grating pitch is reduced away from an optical axis 7, as described above. It is considered that the beams having field angles are classified into an A-side beam having an incident angle smaller than the incident angle θ of the principal ray P of the beams incident on the grating surface 23 and a B-side beam having an incident angle larger than the incident angle θ of the principal ray P. As described above, when the angle of a beam incident on the grating surface 23 increases, the diffraction efficiencies of orders adjacent to the design order increase, as previously described. This conspicuously appears on the B-side beam.

Note that the incident angle is an angle formed between a beam and a normal to the grating surface.

In this embodiment, the stop 16 is disposed on the exit side of the imaging element 1, and B-side beams are partially shielded by the stop 16, as shown in FIG. 4. This makes it possible to improve the diffraction efficiency as a whole and hence suppress the flare.

The stop 3 in Reference Example 1 of FIG. 1 is disposed facing the diffraction optical element 2. The distance between the stop 3 and diffraction optical element 2 along the optical axis is too close to partially shield B-side beams at a level at which the diffraction efficiency for all the beams can be kept satisfactorily.

In the first embodiment, as shown in FIG. 4, the stop 16 is located at a position away from the stop 3 along an optical axis from the diffraction optical element 2 to the line sensor 5.

Figure 6:
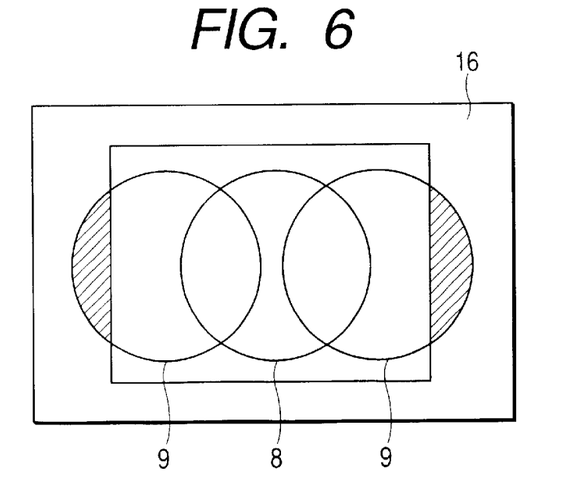
FIG. 6 is a view for explaining the relationship between the stop and beam in the first embodiment of the present invention.

FIG. 6 is a view for explaining how the stop 16 partially shields beams having field angles. An on-axis beam 8 and off-axis beams 9 are incident on the stop 16. Of the off-axis beams 9, the beams indicated by hatched portions are shielded by the stop 16, as shown in FIG. 6.

When the stop 16 is located on the exit side of the imaging element 1, the light amount of the main-scanning light amount profile is reduced at ends on the line sensor 5 surface. However, generally in an image reading apparatus, various factors such as variations in line sensor sensitivity, optical characteristics of an illumination system (not shown), and the cosine fourth law are corrected by shading correction. No problem is posed even if the off-axis beams are partially shielded as in this embodiment.

In this embodiment, letting D be the diameter of the stop 3, f be the focal length of the imaging element 1, Y be the maximum object height, and β be the absolute value of the imaging magnification, the light-shielding member 16 is preferably located so that a distance L from the stop 3 to the stop 16 serving as the exit-side light-shielding member along the optical axis falls within the range:

$$(0.4 \times D \times f)/(Y \times β) < L < (1.2 \times D \times f)/(Y \times β) \quad (A)$$

In this embodiment, D=13.6 mm, f=83.9 mm, Y=152.5 mm, and β=0.220276, so that 13.6<L<40.8, and L=20.0 mm.

Hence, condition (A) holds, and the B-side beams can be efficiently and partially shielded by the stop 16, as shown in FIG. 4. This makes it possible to improve the diffraction efficiency for all the beams and hence suppress the flare.

It should be noted that the stop 16 is used as the light-shielding member in this embodiment, but any member that can shield off-axis beams can be used.

The present invention is not limited to a two-layered diffraction grating 2. Even in a single-layered diffraction optical element, if the stop 16 is disposed to partially shield the B-side beams, as shown in FIG. 4, diffraction efficiency for all the beams can be improved and hence flare can be efficiently suppressed.

The present invention is also applicable to a multilayered (three layers or more) diffraction grating.

In addition, the number of lenses of the imaging element is not limited to four in this embodiment. Any number of lenses can be used if good imaging performance is achieved.

(Second Embodiment)

Figure 7:
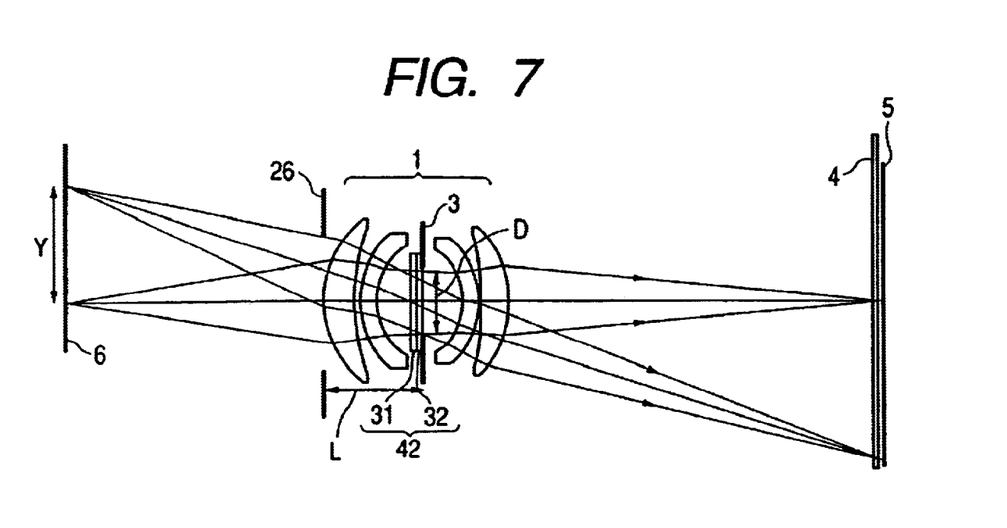
FIG. 7 is a side view showing the main part of the second embodiment when the diffraction optical element is used in an image reading apparatus.
Figure 8:
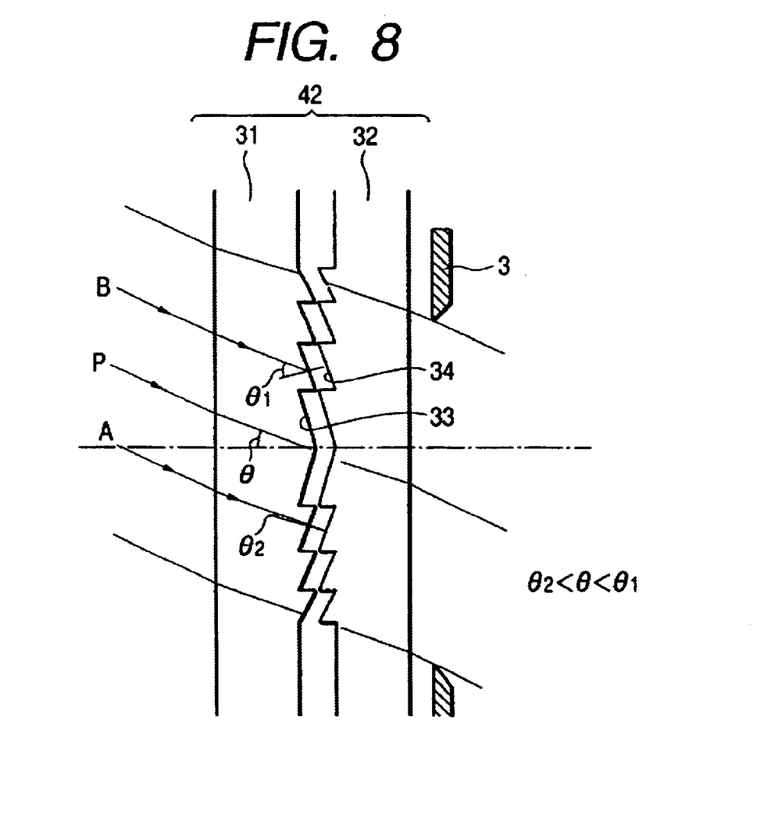
FIG. 8 is an enlarged view of a diffraction grating shown in FIG. 7.

FIG. 7 is a sectional view (main-scanning sectional view) showing the main part of the second embodiment in the main-scanning direction when the diffraction optical element of the present invention is used for an imaging element in an image reading apparatus. FIG. 8 is an enlarged view showing part of a diffraction optical element shown in FIG. 7. FIG. 8 shows a state in which an off-axis beam is shielded by a light-shielding member (stop). The same reference numerals as in FIGS. 1 and 2 denote the same parts in FIGS. 7 and 8.

In the second embodiment, as shown in FIG. 7, a stop 26 is arranged at a position away from a stop 3 along an optical axis from a diffraction optical element 2 to an original surface 6.

The second embodiment is different from the first embodiment in that the shape (saw-toothed shape) of grating surfaces 33 and 34 of first and second gratings 31 and 32 is formed in a direction opposite to that of the shape of the grating surfaces 23 and 24 of the first and second diffraction gratings 21 and 22 shown in FIG. 5. The remaining arrangement and optical action are substantially the same as those of the first embodiment to obtain the same effect as in the first embodiment.

More specifically, a diffraction optical element 42 is comprised of a multilayered diffraction grating in which the saw-toothed (triangular-shaped) first and second diffraction gratings 31 and 32 made of materials having different Abbe's numbers and different refractive indices are stacked and arranged (bonded) on a substrate so as to correspond to each other for each pitch. The shape of the grating surfaces 33 and 34 of the first and second diffraction gratings 31 and 32 is formed in a direction opposite to that of the grating surfaces 23 and 24 shown in FIG. 5. The stop 26 serves as a light-shielding member and is disposed on the incident side (original surface side) of the imaging element 1. Of all beams having field angles and incident on the diffraction optical element 42, beams on the side (B side) where the incident angles are larger than an incident angle θ of a principal ray P of the beams incident on the grating surface 33 are partially shielded.

In this embodiment, a refractive index n1 and Abbe's number ν1 of the material of the first diffraction grating 31 are:

n1=1.5219 ν1=51.0 and a refractive index n2 and Abbe's number ν2 of the material of the second diffraction grating 32 are:

n2=1.6363 ν2=23.0

As described above, according to this embodiment, the stop 26 is disposed on the incident side of the imaging element 1, and B-side beams are partially shielded by the stop 26, as shown in FIG. 7. This makes it possible to improve the diffraction efficiency for all the beams and hence suppress the flare.

In this embodiment, letting D be the diameter of the stop 3, f be the focal length of the imaging element 1, Y be the maximum object height, and β be the absolute value of the imaging magnification, the light-shielding member 26 is preferably located so that a distance L from the stop 3 to the stop 26 serving as the incident-side light-shielding member along the optical axis falls within the range:

$(0.4 \times D \times f)/(Y \times \beta) < L < (1.2 \times D \times f)/(Y \times \beta)$  (B)

In this embodiment, D=13.6 mm, f=83.9 mm, Y=152.5 mm, and β=0.220276, so that 13.6<L<40.8, and L=20.0 mm.

Hence, condition (B) holds, and the B-side beams can be efficiently and partially shielded by the stop 26, as shown in FIG. 8. This makes it possible to improve the diffraction efficiency for all the beams and hence suppress the flare.
(Third Embodiment)

Figure 19:
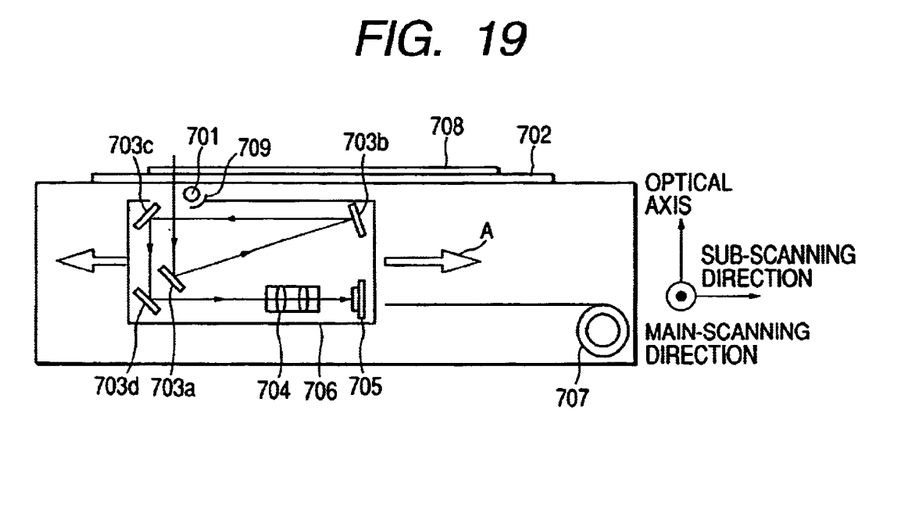
FIG. 19 is a side view showing the main part of the third embodiment when the diffraction optical element of the present invention is used in an image reading apparatus.

FIG. 19 is a schematic view showing the main part when an imaging element for image reading according to the present invention is used in a flat head image scanner.

Referring to FIG. 19, a beam emitted from an illumination light source 701 illuminates an original 708 directly or through a reflector 709. A beam reflected by the original 708 is reflected by first, second, third, and fourth reflecting mirrors 703a, 703b, 703c, and 703d. The optical path of the reflected beam is bent in a carriage 706, and an imaging lens 704 forms the beam into an image on a linear image sensor 705 such as a CCD (Charge Coupled Device) (the sensor 705 will be referred to as a CCD 705 hereinafter). A scanning motor 707 moves the carriage 706 in a direction (sub-scanning direction) indicated by an arrow A in FIG. 19, thereby reading image information of the original 708. The CCD 705 is comprised of a plurality of light-receiving elements arrayed in one direction (main-scanning direction).

In the above arrangement, to downsize the image scanner, the carriage 706 must be downsized. To downsize the carriage 706, for example, the number of reflecting mirrors is increased, or one mirror is used to reflect the beam many times to assure an optical path length.

In this embodiment, the main-scanning length of at least one of the first, second, third, and fourth reflecting mirrors 703a, 703b, 703c, and 704d fixed in the carriage 706 is controlled to efficiently and partially shield the B-side beams. This makes it possible to improve the diffraction efficiency as a whole and hence suppress the flare.

More specifically, the reflecting mirror is used also as a limiting member (light-shielding member) to shorten the main-scanning length of the reflecting mirror 703 as compared with the conventional one. The number of reflecting mirrors for partially shielding the B-side beams is not limited to one. The main-scanning lengths of a plurality of reflecting mirrors may be controlled.
(Fourth Embodiment)

Figure 20:
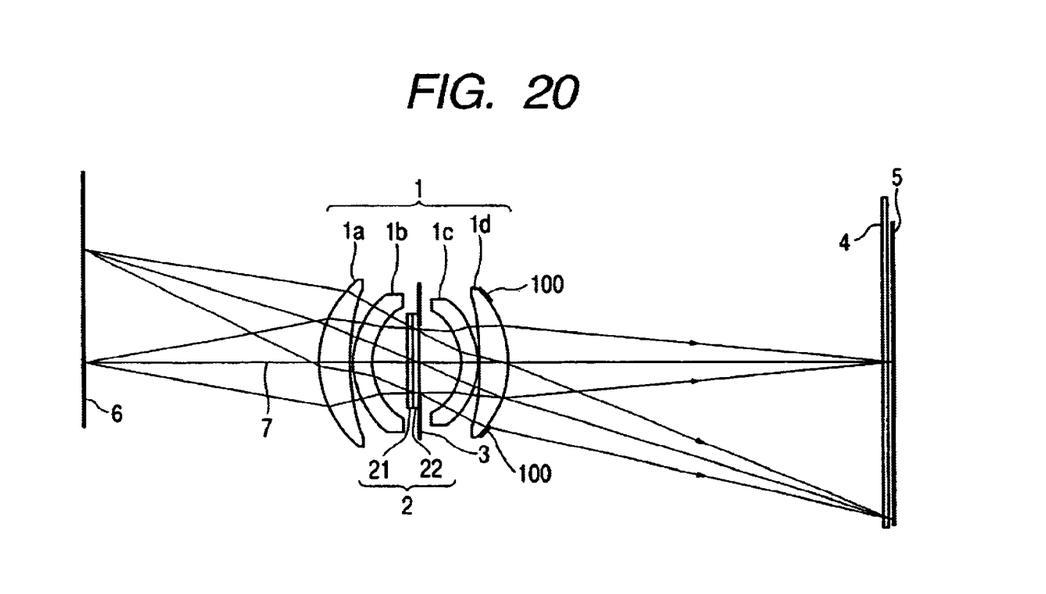
FIG. 20 is a side view showing the main part of the fourth embodiment when the diffraction optical element of the present invention is used in an image reading apparatus.

In this embodiment, light-shielding films 100 for partially shielding B-side beams are provided on two end portions of a lens 1d constituting an imaging element 1.

FIG. 20 is a sectional view (main-scanning sectional view) showing the main part of the fourth embodiment in the main-scanning direction when the diffraction optical element of the present invention is used for an imaging element in an image reading apparatus. FIG. 20 shows a state in which off-axis beams are shielded by the light-shielding films 100. The same reference numerals as in FIG. 1 denote the same parts in FIG. 20.

The fourth embodiment obtains the same effects as in the first embodiment.

In the present invention, the layout of the light-shielding films 100 is not limited to two end portions of the lens 1d. Alternative layout of the light-shielding films may be adapted such that, for example, the light-shielding films may be provided on two end portions of the lens 1a, or on two end portions of a plurality of lenses constituting the imaging element.

The present invention may employ a combination of the first to fourth embodiments. The reflecting mirror 703, the stops 16 and 26, and the light-shielding films 100 may be used in combination.

In the first or second embodiment, the stop serving as the light-shielding member is disposed on the incident or exit side of the imaging element 1. However, the stops may be formed on both the incident and exit sides of the imaging element 1.

In each of the first, second, and third embodiments described above, the present invention is applied to the imaging element of the image reading apparatus. The present invention is not limited to this. The present invention is also applicable to any optical system such as a phototaking lens for a video camera, film camera, or digital camera to obtain the effects of the present invention.

There is provided an imaging element including a diffraction optical element for receiving an off-axis beam with a field angle and a stop, wherein of beams having field angles and incident on the diffraction optical element, beams having incident angles larger than the incident angle of a principal light ray of the beams incident on the grating surface of the diffraction optical element are partially shielded by a light-shielding member, so that the diffraction efficiencies of orders adjacent to a design order are kept low and hence imaging performance almost free from flare can be achieved even if a beam with a field angle is incident.

What is claimed is:

1. An imaging element comprising:
   a diffraction optical element on which off-axis beams with field angles are incident;
   a stop; and
   a limiting member located at a position farther away from said diffraction optical element than said stop,
   wherein said diffraction optical element has a grating surface with grating facets, each of said grating facets having a continuous surface inclined at a blaze angle or having a binary approximation of a nominal surface inclined at a blaze angle, each of said grating facets having a respective facet normal defined as being perpendicular to the respective surface inclined at a blaze angle,
   wherein, of off-axis beams incident on said diffraction optical element and having field angles, beam portions incident on at least one of said grating facets at incident angles larger than the incident angle of the principal ray of the beam of which said portions are a part are partially shielded by said limiting member, and
   wherein the incident angle of a beam portion incident on given grating facet is an angle defined by said beam portion and the normal to the surface of said given grating facet.

2. An imaging element according to claim 1, wherein said diffraction optical element is disposed to face said stop.

3. An imaging element according to claim 1, wherein said limiting member is located outside a lens constituting said imaging element along an optical axis with respect to said diffraction optical element as the center.

4. An imaging element according to claim 1, wherein a grating pitch of said diffraction optical element is reduced from an on-axis side to an off-axis side.

5. An imaging element according to claim 1, wherein said diffraction optical element comprises first and second diffraction gratings, formed of materials with different Abbe's numbers and different refractive indices, are arranged on a substrate such that grating surfaces thereof face each other.

6. An imaging element according to claim 1, wherein said limiting member is disposed on an incident and/or exit side of said imaging element.

7. An imaging element according to claim 5, wherein one of said first and second diffraction gratings, which is made of a material having a higher refractive index is disposed on an original surface side.

8. An imaging element according to claim 5, wherein said one diffraction grating made of the material having a higher refractive index has an incident surface as a flat surface.

9. An imaging element according to claim 5, wherein each of said first and second diffraction gratings is formed on a flat substrate.

10. An imaging element according to claim 5, wherein said first and second diffraction gratings are so stacked as to correspond to each other for each pitch.

11. An imaging element according to claim 6, wherein said limiting member comprises a second stop.

12. An imaging element according to claim 6, wherein said limiting member comprises a reflecting mirror.

13. An imaging element according to claim 6, wherein said limiting member is provided on a surface of a lens constituting said imaging element.

14. An imaging element according to claim 1, wherein said imaging element comprises a lens for forming on a reading element surface an image of image information formed on an original illuminated with a beam from a light source.

15. An imaging element according to claim 14, wherein said imaging element comprises a positive first lens, a negative second lens, a negative third lens, and a positive fourth lens in the order named from the original surface side, said stop is disposed between said negative second lens and said negative third lens, and said diffraction optical element is disposed near said stop.

16. An image element according to claim 1, wherein a marginal beam of off-axis beams having a larger incident angle with respect to a grating surface of said diffraction optical element passes through on the outside of a marginal beam of on-axis beams at said limiting member, and a marginal beam of off-axis beams having a larger incident angle with respect to a grating surface of said diffraction optical element passes through on the inside of a marginal beam of on-axis beams at said stop.

17. An imaging element comprising:
    a diffraction optical element on which off-axis beams with field angles are incident;
    a stop; and
    a limiting member located at a position farther away from said diffraction optical element than said stop,
    wherein said diffraction optical element has a grating surface with grating facets, each of said grating facets having a continuous surface inclined at a blaze angle or having a binary approximation of a nominal surface inclined at a blaze angle, each of said grating facets having a respective facet normal defined as being perpendicular to the respective surface inclined at a blaze angle,
    wherein, of off-axis beams incident on said diffraction optical element and having field angles, beam portions incident on at least one of said grating facets at incident angles larger than the incident angle of the principal ray of the beam of which said portions are a part are partially shielded by said limiting member, with the incident angle of a beam portion incident on given grating facet being an angle defined by said beam portion and the normal to the surface of said given grating facet,
    wherein said limiting member is disposed on an incident and/or exit side of said imaging element,
    wherein said limiting member comprises a second stop,
    and wherein, when D is a diameter of said stop, f is a focal length of said imaging element, Y is a maximum object height, and β is an absolute value of an imaging magnification, a distance L from said stop to said second stop serving as the exit-side light-shielding member along the optical axis falls within a range:

$$(0.4 \times D \times f)/(Y \times \beta) < L < (1.2 \times D \times f)/(Y \times \beta).$$

18. An imaging element comprising:
    a diffraction optical element on which off-axis beams with field angles are incident;
    a stop; and
    a limiting member located at a position farther away from said diffraction optical element than said stop,
    wherein said diffraction optical element has a grating surface with grating facets, each of said grating facets having a continuous surface inclined at a blaze angle or having a binary approximation of a nominal surface inclined at a blaze angle, each of said grating facets having a respective facet normal defined as being perpendicular to the respective surface inclined at a blaze angle, wherein, of off-axis beams incident on said diffraction optical element and having field angles, beam portions incident on at least one of said grating facets at incident angles larger than the incident angle of the principal ray of the beam of which said portions are a part are partially shielded by said limiting member, with the incident angle of a beam portion incident on given grating facet being an angle defined by said beam portion and the normal to the surface of said given grating facet, wherein said limiting member is disposed on an incident and/or exit side of said imaging element, wherein said limiting member comprises a second stop, and wherein, when D is a diameter of said stop, f is a focal length of said imaging element, Y is a maximum object height, and $\beta$ is an absolute value of an imaging magnification, a distance L from said stop to said second stop serving as the incident-side light-shielding member along the optical axis falls within a range:

$$(0.4 \times D \times f)/(Y \times \beta) < L < (1.2 \times D \times f)/(Y \times \beta).$$

19. An image reading apparatus which forms on the reading element surface the image information formed on the original using said imaging element of any one of claims 1, 17 and 18 and includes a controller.

* * * * *